United States Patent [19]
Rosenquist et al.

[11] Patent Number: 6,031,036
[45] Date of Patent: Feb. 29, 2000

[54] FLAME RESISTANT THERMOPLASTIC BLENDS HAVING REDUCED DRIPPAGE

[75] Inventors: Niles Richard Rosenquist, Evansville; Angelika Howard Clark, Mt. Vernon, both of Ind.

[73] Assignee: General Electric Company, Pittsfield, Mass.

[21] Appl. No.: 08/165,565

[22] Filed: Dec. 10, 1993

Related U.S. Application Data

[63] Continuation of application No. 07/957,495, Oct. 7, 1992, abandoned.

[51] Int. Cl.$^7$ ............... C08K 5/42; C08K 3/04; C08K 3/22; C08L 69/00
[52] U.S. Cl. .......... 524/164; 524/161; 524/162; 524/163; 524/537; 525/425; 525/431; 525/433
[58] Field of Search ............... 525/425, 431, 525/433; 524/161, 162, 163, 164, 537

[56] References Cited

U.S. PATENT DOCUMENTS

| | | |
|---|---|---|
| 3,933,734 | 1/1976 | Mark et al. |
| 3,940,366 | 2/1976 | Mark |
| 3,948,851 | 4/1976 | Mark |
| 3,953,399 | 4/1976 | Mark |
| 3,978,024 | 8/1976 | Mark et al. |
| 4,104,245 | 8/1978 | Mark ...................... 524/164 |
| 4,231,920 | 11/1980 | Mark et al. |
| 4,923,933 | 5/1990 | Curry ...................... 525/439 |
| 5,032,639 | 7/1991 | Buchert ................... 524/494 |
| 5,153,251 | 10/1992 | Lupinski .................. 524/447 |
| 5,204,400 | 4/1993 | Kelley ..................... 524/405 |

FOREIGN PATENT DOCUMENTS

| | | |
|---|---|---|
| 0 377 210 | 7/1990 | European Pat. Off. |
| 2 256 210 | 8/1975 | France |
| 25 35 263 | 2/1976 | Germany |
| 33 00 853 | 8/1983 | Germany |

*Primary Examiner*—David Buttner

[57] ABSTRACT

Disclosed are aromatic brominated polycarbonate/polyester carbonate/silicone polyimide compositions having improved flame resistance and reduced drippage and heat release rate, comprising by weight:

(A) from about 20 to about 77 parts of an aromatic brominated polycarbonate resin;

(B) from about 20 to about 77 parts of a polyester carbonate resin;

(C) from about 0.5 to about 10 parts of a silicone-polyimide resin;

(D) from about 0 to about 25 parts of an aromatic polycarbonate having a molecular weight of from about 40,000 to about 90,000; the sum of (A)–(D) being 100 parts by weight;

(E) from about 0.05 to about 2.0 parts of a metal salt of a halogenated monomeric or polymeric aromatic sulfonic acid or mixtures thereof, wherein the metal salt is selected from the group consisting of alkali metal salts, alkaline earth metal salts, and mixtures of the metal salts; and (F) from about 0.1 to about 5.0 parts by weight of filler or a pigment.

1 Claim, No Drawings

FLAME RESISTANT THERMOPLASTIC BLENDS HAVING REDUCED DRIPPAGE

This is a continuation of application Ser. No. 07/957,495 filed on Oct. 7, 1992 now abandoned.

BACKGROUND OF THE INVENTION

This invention relates to flame resistant thermoplastic blends. More particularly, this invention relates to a certain type of salt additives which reduces the drippage of thermoplastic blends containing an aromatic brominated polycarbonate, polyester carbonate, and silicone polyimide.

Aromatic brominated polycarbonate/polyester carbonate/silicone polyimide blends are known in the art. Reference is made, for example, to U.S. Pat. No. 4,923,933 to Curry. In the Curry patent, such blends are disclosed to be flame resistant and particularly useful for the construction of aircraft interior panels and parts which must exhibit low flammability and low smoke generation characteristics. Various requirements have been placed on the flame resistance and smoke generation of materials used in the construction of panels and parts for the interiors of commercial aircraft. Exemplary flammability requirements include those set forth in the 1986 and 1990 amendments to Part 25—Airworthiness Standards—Transport Category Airplanes of Title 14, Code of Federal Regulations (See 51 Federal Register 26206, Jul. 21, 1986 and 51 Federal Register 28322, Aug. 7, 1986). The flammability standards are based on heat calorimetry tests developed at Ohio State University and are described in the above-cited amendments to 14 C.F.R. Part 25, which are hereby incorporated by reference herein.

Although such blends have good flame resistance, it is desirable to reduce the drippage which occurs when such blends are burned.

SUMMARY OF THE INVENTION

The present invention is based on the discovery that the addition of a metal salt of a monomeric or polymeric halogenated aromatic sulfonic acid, preferably, sodium 2,4,5-trichlorobenzene sulfonate, to aromatic brominated polycarbonate/polyester carbonate/silicone polyimide blends will reduce the drippage that occurs when such blends are burned.

Accordingly, the present invention provides an aromatic brominated polycarbonate/polyester carbonate/silicone polyimide blend having improved flame resistance and reduced drippage and heat release rate, comprising by weight:
- (A) from about 20 to about 77 parts of an aromatic brominated polycarbonate resin;
- (B) from about 20 to about 77 parts of a polyester carbonate resin;
- (C) from about 0.5 to about 10 parts of a silicone-polyimide resin;
- (D) from about 0 to about 25 parts of an unsubstituted aromatic polycarbonate having a molecular weight of from about 40,000 to about 90,000; the sum of (A)–(D) being 100 parts by weight;
- (E) from about 0.05 to about 2.0 parts of a metal salt of a monomeric or polymeric halogenated aromatic sulfonic acid or mixtures thereof, wherein the metal salt is selected from the group consisting of alkali metal salts, alkaline earth metal salts, and mixtures of the metal salts; and
- (F) from about 0.1 to about 5.0 parts by weight of filler or a pigment.

The present invention further provides a method for reducing the drippage during burning of a composition comprising ingredients (A)–(C); optionally, (D); and (F), wherein the method comprises the step of adding (E) to said composition. In addition, the present invention provides a method for reducing the heat release properties of a composition comprising ingredients (A)–(C); optionally, (D); and (E); wherein the method comprises the step of adding (F) to said composition.

DETAILED DESCRIPTION OF THE INVENTION

The compositions of this invention contain (A) an aromatic brominated polycarbonate resin; (B) a polyester carbonate resin; (C) a silicone-polyimide resin; optionally, (D) an aromatic unsubstituted polycarbonate; (E) a metal salt of a monomeric or polymeric halogenated aromatic sulfonic acid or mixtures thereof; and (F) filler or a pigment which is effective to lower the heat release of the compositions.

The compositions of this invention contain from about 20 to about 77, preferably from about 30 to about 50, and most preferably from about 35 to about 47 parts of (A); from about 20 to about 77, preferably from about 45 to about 55, and most preferably from about 47 to about 53, parts by weight of (B); from about 0.5 to about 10, preferably from about 2 to about 7, and most preferably from about 3 to about 5, parts by weight of (C); from about 0 to about 25, preferably from about 0 to about 10, and most preferably from about 0 to about 5, parts by weight of (D); the sum of (A)–(D) being 100 parts by weight; and from about 0.05 to about 2.0, preferably from about 0.08 to about 0.4, and most preferably from about 0.08 to about 0.2, parts by weight of (E) per 100 parts of the combined weight of (A)–(D). The filler or pigment (F) is present in an amount ranging from about 0.1 to about 5, preferably from about 0.2 to about 4, and most preferably from about 0.25 to about 3, parts by weight, per 100 parts by weight of the combined parts in weight of (A)–(D).

Component (A) in the composition of this invention is a brominated polycarbonate. These brominated polycarbonates are high molecular weight, flame retardant, thermoplastic, aromatic polymers having average molecular weights of about 8000 to more than 200,000, preferably of about 20,000 to 80,000 and an intrinsic viscosity of 0.40 to 1.0 dl/g as measured in methylene chloride at 250C. The brominated polycarbonate can be branched or unbranched.

The brominated polycarbonates are preferably derived from brominated dihydric phenols and carbonate precursors. Alternatively, the brominated polycarbonates may be derived from a carbonate precursor and a mixture of brominated and non-brominated aromatic dihydric phenols. Suitable flame retardant brominated polycarbonates are disclosed in U.S. Pat. No. 4,923,933 (Curry), U.S. Pat. No. 4,170,711 (Orlando et al.), and U.S. Pat. No. 3,929,908 (Orlando et al.), each of which is incorporated by reference herein.

Preferred brominated dihydric phenols include 2,2-bis(3,5-dibromo-4-hydroxyphenyl)propane and 2,2',6,6'-tetramethyl-3,3',5,5'-tetrabromo-4,4'-biphenol.

Suitable non-brominated dihydric phenols for mixing with brominated dihydric phenols to produce brominated polycarbonates include, for example, 2,2-bis(4-hydroxyphenyl)propane, bis(4-hydroxyphenyl)methane, 2,2-bis(4-hydroxy-3-methylphenyl)propane, 4,4-bis(4- hydroxyphenyl)heptane, and (3,3'-dichloro-4,4'-dihydroxydiphenyl)methane.

Mixtures of two or more different brominated and non-brominated dihydric phenols can be used. Branched brominated polycarbonates can also be used, as can blends of a linear brominated polycarbonate and a branched brominated polycarbonate.

The carbonate precursor can be a carbonyl halide. The carbonyl halides which can be used are carbonyl bromide, carbonyl chloride, and mixtures thereof.

The polycarbonates used in this invention can be manufactured according to procedures known in the art, such as, for example, by reacting a brominated dihydric phenol, or a mixture of brominated dihydric phenol and a non-brominated dihydric phenol, with a carbonate precursor such as diphenyl carbonate or phosgene in accordance with the methods set forth in U.S. Pat. Nos. 4,081,750 and 4,123,436, which are incorporated by reference herein. If a mixture of dihydric phenols is used, then preferably the mixture contains at least 25 percent of a brominated dihydric phenol, more preferably contains at least 25 to 55 mole percent of a brominated dihydric phenol so as to render a flame retardant brominated polycarbonate. Most preferably, the polycarbonate is derived from a dihydric phenol composition containing 25 to 35 mole percent of a brominated dihdyric phenol and 75 to 65 mole percent of a non-brominated dihydric phenol.

The aromatic polycarbonates are typically prepared by using a monofunctional molecular weight regulator, an acid acceptor and a catalyst. The molecular weight regulators which can be used include phenol, alkylated phenols, such as 4-(1,1,3,3-tetramethylbutyl)phenol, paratertiary-butyl-phenol, 4-cumyl phenol, and the like. Preferably, phenol or an alkylated phenol is used as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, and the like. The inorganic acid acceptor can be one which can be either a hydroxide, a carbonate, a bicarbonate, or a phosphate of an alkali or alkaline earth metal.

The catalysts which can be used are those that typically aid the polymerization of the monomer with phosgene. Suitable catalysts include tertiary amines such as triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetra-methyl ammonium hydroxide, tetra-n-butyl ammonium iodide, benzyltrimethyl ammonium chloride, and quaternary phosphonium compounds such as, for example, n-butyltriphenyl phosphonium bromide, and methyltriphenyl phosphonium bromide.

The most preferred brominated polycarbonate is prepared from a mixture of 29 mole percent of 2,2-bis(3, 5-dibromo-4-hydroxyphenyl) propane and 71 mole percent of bisphenol A with phosgene to produce a brominated polycarbonate resin which has a random mixture of repeating units which are generally represented by the formula:

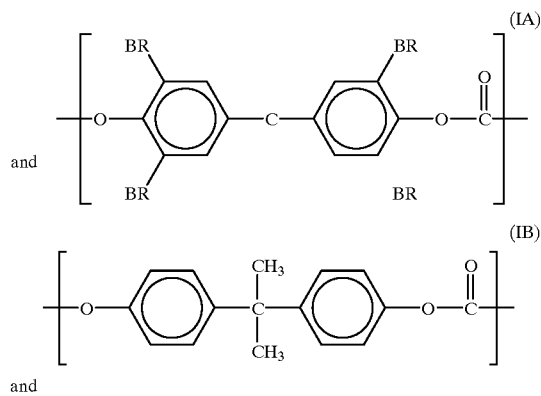

Known processes for polycarbonate preparation include melt processes and interfacial polymerization. Polyestercarbonates and the methods for their preparation are well known in the art as disclosed in U.S. Pat. Nos. 3,303,331; herein. The polyphthalate carbonates used in the present invention may be made by known methods for making polyestercarbonates.

Component (B) of the composition of this invention is a polyphthalatecarbonate. These polymers are polyesters containing carbonate, phthalate groups, and aromatic carbocyclic groups in the polymer chain. The polyphthalatecarbonates can be prepared by reacting a difunctional phthalic acid or a reactive derivative of the acid such as the acid dihalide, hereinafter referred to as a phthalate composition, a dihydric phenol and a carbonate precursor. Preferably, the dihydric phenol and the combined moles of phthalate composition and carbonate precursor are in a mole ratio of from about 52:48 to 48:52 and more preferably about 50:50. Preferably, the phthalate composition and the carbonate precursor are reacted in a mole ratio of from 90:10 to 32:68, more preferably from 80:20 to 48:52 and most preferably about 72:28.

Dihydric phenols which can be used to prepare the polyphthalatecarbonates are disclosed, for example, in U.S. Pat. No. 4,923,933 to Curry, which is hereby incorporated by reference herein. Examples of such dihydric phenols include 2,2-bis(4-hydroxyphenyl)propane (also known as "bisphenol A" or "BPA"), 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 2,2-bis(3-phenyl-4-hydroxyphenyl) propane, bis-(4-hydroxyphenyl)-cyclohexylmethane, and 2,2-bis(4-hydroxyphenyl)-1-phenylpropane.

These dihydric phenols may be used alone or as a mixture of two or more different dihydric phenols. The most preferred dihydric phenol is bisphenol A.

In general, the term difunctional phthalic acid is meant to include its reactive derivative such as the acid dihalide.

The phthalic acids which may be used as the phthalate composition in preparing the polyphthalatecarbonates useful in the practice of this invention include isophthalic acid, terephthalic acid, and mixtures thereof. More preferably, the phthalate composition is a mixture of the acid dihalides of terephthalic acid and isophthalic acid in a mole ratio of from about 6:94 to about 90:10 and most preferably in a mole ratio of about 7:93.

The carbonate precursor may be either a carbonyl halide, a carbonate ester, or a haloformate. The carbonyl halides which can be used herein are carbonyl chloride, carbonyl bromide, and mixtures thereof. Examples of carbonate esters which can be used herein are diphenyl carbonate, di(halophenyl)carbonates such as di(chlorophenyl) carbonate, di(bromophenyl)carbonate, di(trichlorophenyl) carbonate, di(tribromophenyl)carbonate,; di(naphthyl) carbonate; di(chloronaphthyl)carbonate; phenyl tolyl carbonate; chlorophenyl chloronaphthyl carbonate, and the like, or mixtures thereof. The haloformates useful herein include bishaloformates of dihydric phenols (bischloroformates of hydroquinone, and the like) or glycols (bishaloformates of ethylene glycol, neopentyl glycol, polyethylene glycol, and the like). Carbonyl chloride, also known as phosgene, is most preferred.

Also present during the co-reaction between the dihydric phenol, the carbonate precursor and the phthalic acid or its reactive derivative are catalysts, molecular weight regulators, and acid acceptors. Examples of suitable molecular weight regulators include phenol, 4-cumyl phenol, tertiary butyl phenol, and the like. Examples of suitable catalysts include tertiary amines, quaternary ammonium compounds, quaternary phosphonium compounds, and the like. Examples of suitable acid acceptors include tertiary amines, alkali or alkaline earth metal hydroxides, and the like.

The polyphthalatecarbonate resins derived from dihydric phenols, phthalic acids or their reactive derivatives such as the phthalic acid dihalides, e.g., dichlorides and phosgene exhibit high levels of resistance to heat. A more preferred class of polyphthalatecarbonate resins are those derived from bisphenol A; terephthalic acid, isophthalic acid, or a mixture of isophtalic acid and terephthalic acids or isophthaloyl chloride, terephthaloyl chloride, or a mixture of isophthaloyl and terephthaloyl chloride; and phosgene. The most preferred polyphthalatecarbonate resin is derived from bisphenol A; phosgene; and a mixture of terephthaloyl dichloride and isophthaloyl dichloride wherein the terephthaloyl dichloride and isophthaloyl dichloride are present in a mole ratio of terephthaloyl dichloride to isophthaloyl dichloride of from about 5:95 to 95:5, more preferably the mole ratio of terephthaloyl dichloride to isophthaloyl dichloride being from about 6:94 to 90:10, and most preferably the ratio thereof being about 7:93.

Component (C) is a silicone-polyimide. Suitable silicone-polyimides can be prepared according to the procedures described in U.S. Pat. No. 4,923,933 to Curry, which was hereinabove incorporated by reference herein. In one method disclosed in Curry, such silicone-polyimides are prepared by reacting an amine-terminated polydiorganosiloxane, an aryldiamine, and substantially equal molar amounts of aromatic bisanhydride and organic dianhydrides.

The presence of the silicone polyimide reduces the smoke generation of the composition of this invention.

Preferably, the compositions of this invention further contain (D) an aromatic unsubstituted polycarbonate having a molecular weight of from about 40,000 to about 90,000, preferably from about 43,000 to about 80,000, and most preferably from about 45,000 to about 60,000. The molecular weight of the polycarbonate resin (D) is important for purposes of this invention because its increased viscosity will decrease a tendency of the blend to flow during the OSU flammability test.

The term "polycarbonate" as used herein to represent (D) embraces those polycarbonates comprising repeating units of the formula (II)

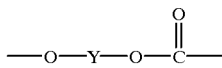

wherein Y is a divalent aromatic radical derived from a dihydroxyaromatic compound of the formula HO—Y—OH. Typical dihydroxyaromatic compounds are 2,2-bis-(4-hydroxyphenyl)propane, also known as bisphenol A (BPA); bis(4-hydroxyphenyl)methane; 2,2-bis(4-hydroxy-3-methylphenyl)propane; 4,4-bis(4-hydroxyphenyl)heptane; 4,4'-dihydroxydiphenylsulfone, and 4,4'-dihydroxyl diphenylsulfide. Most preferably, Y is a 2,2-bis-(4-hydroxyphenyl)propyl radical, in which case, the polycarbonate is a "bisphenol A polycarbonate".

The polycarbonates used in this invention may be prepared by reacting the dihydroxyaromatic compound with a carbonate precursor such as phosgene, a haloformate or a carbonate ester, a molecular weight regulator, an acid acceptor and a catalyst. Methods for preparing polycarbonates are known in the art and are described, for example, in U.S. Pat. No. 4,452,933, which is hereby incorporated by reference herein.

Examples of suitable carbonate precursors include carbonyl bromide, carbonyl chloride, and mixtures thereof; diphenyl carbonate; a di(halophenyl)carbonate, e.g., di(trichlorophenyl) carbonate, di(tribromophenyl) carbonate, and the like; di(alkylphenyl)carbonate, e.g., di(tolyl)carbonate; di(naphthyl)carbonate; di(chloronaphthyl)carbonate, or mixtures thereof; and bishaloformates of dihydric phenols.

Examples of suitable molecular weight regulators include phenol, alkylated phenols, such as 4-(1,1,3,3-tetramethylbutyl)phenol, 4-cumyl phenol, para-tertiary-butyl-phenol, and the like. The preferred molecular weight regulator is phenol or an alkylated phenol.

The acid acceptor can be either an organic or an inorganic acid acceptor. A suitable organic acid acceptor is a tertiary amine and includes such materials as pyridine, triethylamine, dimethylaniline, tributylamine, and the like. The inorganic acid acceptor can be either a hydroxide, a carbonate, a bicarbonate, or a phosphate of an alkali or alkaline earth metal.

The catalyst which can be used are those that typically aid the polymerization of the monomer with phosgene. Suitable catalysts include tertiary amines such as triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethyl ammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Component (E) of the composition of this invention is a metal salt of a monomeric or polymeric substituted aromatic sulfonic acid and includes mixtures thereof. The metal salt used in the practice of this invention is either the alkali metal or alkaline earth metal salt or mixtures of these. The metals of these groups are sodium, lithium, potassium, rubidium, cesium, beryllium, magnesium, calcium, strontium, and barium. Metal salts of halogenated aromatic sulfonic acids useful in the present invention are disclosed, for example, in U.S. Pat. No. 3,940,366 (Mark), which is hereby incorporated by reference herein.

The aromatic sulfonic acid used in the practice of this invention is a halogenated aromatic sulfonic acid. The sulfonic acid contains 1 or more halogen substituents. If more than one, all of the halogen substituents may be the same or different halogens. Preferably, the halogen substituent or substituents are all chlorine.

The types of sulfonic acids used herein may be either the monomeric form or the polymeric form or mixtures of these. The metal salt of the monomeric aromatic sulfonic acid can best be represented by the following formula:

$$[A]_{o-1}[R]_{o-1}[B] \qquad (III)$$

wherein [A] and [B] can, in turn, be independently selected from the following formula:

$$R^1_x(SO_3M)_y R^2 \qquad (IV)$$

wherein R is an organic radical of from 1 to 20 carbon atoms and is selected from the group consisting of alkyl, aralkyl, alkenyl, aralkenyl, aryl, arylene, alkylene, aralkylene, alkenylene, aralkenylene, alkylidene, aralkylidene, alkenylidene, or aralkenylidene; $R^1$ is a halogen radical, M is a metal which may be selected from the periodic table of either an alkali metal or an alkali earth metal, $R^2$ is an aryl radical of 1–4 aromatic rings, x is an integer of 1–17, preferably an integer of 1–8, and y is an integer of 1–10, preferably an integer of 1–3.

Preferably, the metal salt in the monomeric form has the formula (V)

wherein z is a number in the range of 1–5, preferably in the range of 2–4.

The most preferred metal salt used in the monomeric form is the sodium salt of 2,4,5-trichlorobenzenesulfonic acid, which has the formula (VI)

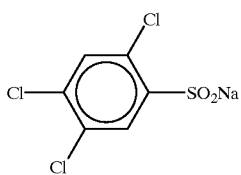

When the polymeric form of the substituted aromatic sulfonic acid is used in the practice of this invention, it can be represented by the formula

$$[A]_m[R^3]_{m+n}[B]_n \qquad (VII)$$

wherein [A] and [B] are independently selected from the formula (IV) above.

Mixtures of the various metal salts of the monomeric substituted acids can be used herein.

It is to be understood that the polymeric structure can be either a homopolymer, a copolymer, a random copolymer, a block copolymer, or a random-block copolymer, or mixtures of these polymeric forms. The ratio of sulfonated aromatic rings to unsulfonated aromatic rings can vary from greater than 1:1 to as high as 1:100.

However, it is to be understood that [A] and [B] units can be randomly selected. In addition, [$R^3$] is an organic radical of 1–20 carbon atoms and is either arylene, alkylene, aralkylene, alkenylene, aralkenylene, alkylidene, aralkylidene, alkenylidene, and aralkenylidene. In the polymeric form, [$R^3$] cannot be monovalent as in the case of monomeric form of the additive used herein and described by formula III. In formula VII, the sum of m and n must be at least 4 and can be as high as 2000. As shown, the selection of m and n can be random or equal or one can be zero.

The preferred metal salt of either the monomeric or polymeric substituted and unsubstituted aromatic sulfonic acid is the sodium salt of 2,4,5-trichlorobenzenesulfonic acid, i.e., sodium 2,4,5-trichlorobenzenesulfonate.

The compositions of this invention also contain (F) filler or a pigment which lowers the heat release of the composition. Suitable fillers would include those mineral fillers compatible with polycarbonate such as treated clays of various types, talc, titanium dioxide, glass particulates and/or fibers, zinc oxide, treated silica and carbon black. The filler or pigment is used in an amount effective to lower the heat release of the blends of this invention, i.e., from about 0.10 to about 5.0, preferably from about 0.20 to about 4.0, and most preferably from about 0.25 to about 3.0, parts per 100 parts of the combined weight in parts of (A)–(D).

Preferably, the compositions of this invention contain (F) a pigment selected from titanium dioxide and carbon black to lower the OSU Peak characteristics of the blends (OSU Peak is defined under Experimental hereinafter.) When used, the titanium dioxide or carbon black is typically used in an amount ranging from about 0.10 to about 2.5, preferably from about 0.20 to about 2, and most preferably from about 0.25 to about 2 parts per 100 parts of the combined weight of (A), (B), (C) and (D).

It is contemplated that the compositions of this invention may also contain other additive materials such as stabilizers, plasticizers, flexibilizers, surfactant agents, other pigments, dyes, reinforcements, flame retardants and diluents in conventional amounts. Examples of such ingredients include silica, clay, silanes, titanates, or other coupling agents, stabilizers, antidegradants, processing aids, adhesives, tackifiers, wax, and discontinuous fibers such as wood cellulose or glass fibers, and the like.

Methods for forming polycarbonate/polyphthalatecarbonate/silicone polyimide blends vary considerably. Prior art blending techniques are generally satisfactory. A preferred method comprises blending the polymers and additives such as reinforcements in powder, granular or filamentous form, extruding the blend, and chopping the extrudate into pellets suitable for molding by means conventionally used to mold normally solid thermoplastic compositions.

The blends of the present invention have application in a wide variety of physical shapes and forms, including the use as films, molding compound, coatings, and the like. When used as films or when made into molded products prepared therefrom, they not only possess good physical properties at room temperature but they retain their strength and excellent response to work loading at elevated temperatures for long periods of time. Films formed from the blends of this invention may be used in applications where films have been used previously. Thus, the blends of the present invention can be used in automobile, bus, rail, and aviation applications for decorative and protective purposes. They are particularly suited for these applications due to their low smoke and flammability characteristics. The blends can also be used in laminated structures where films or solutions of the blend are applied to various heat-resistant or other type of materials such as asbestos, mica, glass fiber, and the like, the sheets superimposed one upon the other, and thereafter subjecting the sheets to elevated temperatures and pressures to effect flow and cure of the resinous binder to yield cohesive laminated structures. Sheets may be made from the blends and subsequently thermoformed into panels for the interiors of aircraft. Panels and parts for aircraft interiors may also be formed by injection molding or the like. In addition, the blends of this invention may be used in combination with a polyvinyl fluoride material, wherein the latter is applied to the surface of a sheet formed from the blends of this invention. Such laminates can be used to protect surfaces from harmful chemical effects and can also be used for decorative purposes. Examples of suitable polyvinyl fluoride materials include Tedlar® polyvinyl fluoride.

The following examples illustrate specific blends in accordance with the present invention. It should be understood that the examples are given for the purpose of illustration and do not limit the invention. In the examples, all parts and percentages are by weight unless otherwise specified.

EXPERIMENTAL

EXAMPLES 1–3 AND COMPARATIVE EXAMPLES A AND B

In the examples below, the following terms have the meanings set forth below:

PPC—a polyphthalate carbonate derived from the reaction of bisphenol A with phosgene and a mixture of isophthaloyl chloride and terephthaloyl chloride. The phosgene and the mixture were in a mole ratio of 28:72 and the mixture contained 7 mole % terephthaloyl chloride and 93 mole % isophthaloyl chloride.

TBBPA/BPA PC—a polycarbonate obtained from the reaction products of a 71:29 molar ratio mixture of BPA and a brominated dihydric phenol with phosgene, in which the brominated dihydric phenol is 2,2-bis(3,5-dibromo-4-hydroxyphenyl)propane.

PC—a polycarbonate having a molecular weight of about 80,000 and obtained from the reaction products of BPA with phosgene.

SPI—a polyetherimide/polydimethylsiloxane copolymer commercially available from General Electric Company as Ultem®D9000

Stabilizer A—Irgafos® 168 stabilizer, supplied by Ciba Geigy Corporation

Stabilizer B—Mark®135A stabilizer, supplied by Witco Corporation

Pigment—pacified titanium dioxide or carbon

STB—sodium-2,4,5-trichlorobenzenesulfonate

KSS—potassium diphenylsulfone-3-sulfonate

OSU Peak—the heat peak release in $KW/M^2$ as determined under the Ohio State University Heat Release Test NBS Smoke Ds4—the National Bureau of Standards smoke density as tested by ASTM F814-83, flaming mode, at 4 minutes Nine compositions were prepared having the formulations set forth in Table I below. The term "pph" represents parts per hundred parts by weight of the combined parts by weight of PPC, TBBPA/BPA, PC and SPI.

Test specimens having a thickness of 80 mils were prepared from each of the nine compositions set forth in Table 1 below which test specimens are suitable for testing according to OSU Peak and NBS Smoke Ds 4 test procedures.

TABLE I

Formulations: Examples 1–7 and Comparative Examples A and B

| Ingredients | 1 | 2 | 3 | 4 | 5 | 6 | 7 | A | B |
|---|---|---|---|---|---|---|---|---|---|
| PPC (%) | 24.4 | 45 | 52 | 45 | 45 | 45 | 44.5 | 45 | 25 |
| TBBPA/BPA (%) | 40 | 40 | 45 | 40 | 40 | 40 | 40 | 40 | 40 |
| PC (%) | 25 | 10 | — | 10 | 10 | 10 | 10 | 10 | 25 |
| SPI (%) | 10 | 5 | 3 | 5 | 5 | 5 | 5.5 | 5 | 10 |
| Stabilizer A (pph) | — | 0.1 | 0.1 | — | — | — | 0.1 | 0.1 | — |
| Stabilizer B (pph) | — | — | — | 0.05 | 0.05 | 0.05 | — | — | — |
| STB (pph) | 0.6 | 0.8 | 0.08 | 0.8 | 0.8 | 0.8 | 0.8 | — | — |
| KSS (pph) | — | — | — | — | — | — | — | 0.8 | — |
| $TiO_2$ (pph) | — | 1.5 | 1.5 | 0.5 | 2.0 | — | — | 1.5 | — |
| Carbon Black (pph) | — | — | — | — | — | 0.3 | — | — | — |

Example 1 illustrates the effect of STB on the charring and drip properties of a polymeric blend containing brominated polycarbonate, polyester carbonate, and silicone polyetherimide.

Example 2 illustrates the effect of STB, stabilizer and pigment on the charring, drip, and OSU properties of a polymeric blend containing brominated polycarbonate, polyester carbonate, and silicone polyetherimide.

Example 3 illustrates the effect of a minimal level of STB and the absence of PC on the prevention of drippage.

Examples 4–7 show the effects of lower and higher levels of $TiO_2$ and of carbon on the OSU peak heat release, in comparison with examples 1 and 2 and B.

Comparative Example A illustrates the effect of KSS, stabilizer and pigment on the charring and drip properties of a polymeric blend containing brominated polycarbonate, polyester carbonate, and silicone polyetherimide.

Comparative Example B illustrates the charring and drip properties of a polymeric blend not containing STB, KSS, a stabilizer or a pigment.

The drippage and flame retardant properties of test specimens of the compositions prepared in Examples 1–7 and Comparative Examples A and B are shown in Table II below:

TABLE II

Properties: Examples 1–7 and Comparative Examples A and B

| Properties | 1 | 2 | 3 | 4 | 5 | 6 | 7 | Comp. A | Comp. B |
|---|---|---|---|---|---|---|---|---|---|
| Appearance | Char, No Drip | Char, No Drip | Char, Sag, Drip Late in Test | Char, No Drip | Char, No Drip | Char, No Drip | Char, No Drip | Melts and Flows Out of Tray | Dripping |
| OSU Peak | 62 | 49 | 42 | 56 | 50 | 30 | 68 | 48 | 62 |
| NBS Smoke Ds4 | — | 79 | 40 | 56 | 44 | 36 | 75 | 64 | — |

The data presented in Table II above indicates that the compositions prepared in Examples 1 and 2, each of which contained STB, did not drip. A comparison of Example 1 and Comparative Example B, which were virtually identical except that the composition of Example 1 contained STB while the composition in Comparative Example B did not, shows that STB does impact the drip properties of the composition. A comparison of Example 2 and Comparative Example A, which were identical except that the composition of Example 2 contained STB while the composition of Comparative Example A contained KSS, shows that STB prevents dripping and KSS does not. The examples also illustrate that the presence of stabilizer and pigment (Example 2 and Comparative Example A) reduces the OSU peak heat release. As to Example 3, the results shown in Table II indicate the effect of a low level of STB and the absence of PC on dripping. The remaining examples show the effects of lower and higher levels of TiO$_2$ and of carbon on the OSU peak heat release, in comparison with examples 1 and 2 and B. A comparison between Example 7 and Examples 2, 4, 5, and 6 wherein all have essentially the same resin composition shows the effect of STB alone in Example 7 to the effect of various combinations of STB and pigments in the other examples.

Examples 8 and 9

Employing the formulation of Example 3, test specimens having a thickness of 40 mils were similarly prepared as in Examples 1–7 with the test specimen of Example 9 having affixed to one surface thereof Tedlar polyvinyl fluoride film, having a thickness of 2 mils with a thermally activated adhesive. Test results are shown in Table III below.

TABLE III

| | Example 8 | Example 9 |
|---|---|---|
| OSU Peak | 38 | 42 |
| NBS Smoke Ds4 | 29 | 41 |

What is claimed is:

1. An aromatic brominated polycarbonate/polyester carbonate/silicone polyimide composition having improved flame resistance and reduced drippage and heat release rate, consisting essentially of:
   (A) from about 20 to about 77 parts by weight of an aromatic brominated polycarbonate resin;
   (B) from about 20 to about 77 parts by weight of a polyester carbonate resin;
   (C) from about 0.5 to about 10 parts by weight of a silicone-polyimide resin;
   (D) about 10 parts of an aromatic polycarbonate having a molecular weight of from about 40,000 to about 90,000; the sum of (A)–(D) being 100 parts by weight;
   (E) from about 0.08 to about 0.4 parts of the sodium salt of 2,3,5-trichlorobenzene sulfonic acid and
   (F) from about 0.1 to about 5.0 parts by weight of titanium dioxide or carbon black.

* * * * *